United States Patent [19]

Karlsson

[11] Patent Number: 4,828,043

[45] Date of Patent: May 9, 1989

[54] DEVICE FOR ADJUSTING THE DISTANCE BETWEEN SOIL-WORKING TOOLS

[76] Inventor: Rune Karlsson, Blacksta, Postlåda 5133, S-61100 Nyköping, Sweden

[21] Appl. No.: 28,194

[22] Filed: Mar. 19, 1987

[30] Foreign Application Priority Data

Mar. 21, 1986 [SE] Sweden ................................. 8601335

[51] Int. Cl.$^4$ .......................... A01B 3/36; A01B 63/32
[52] U.S. Cl. ................... 172/656; 172/260.5; 172/476
[58] Field of Search .............. 172/476, 646, 648, 658, 172/656

[56] References Cited

U.S. PATENT DOCUMENTS

| | | |
|---|---|---|
| 770,372 | 9/1904 | Lake ................................... 172/646 |
| 1,189,982 | 7/1916 | McKay .......................... 172/656 X |

FOREIGN PATENT DOCUMENTS

| | | | |
|---|---|---|---|
| 1006494 | 1/1952 | France ................................ 172/648 |
| 8402338 | 2/1985 | Sweden . | |
| 1574517 | 9/1980 | United Kingdom ................ 172/656 |

*Primary Examiner*—Richard J. Johnson
*Attorney, Agent, or Firm*—Cushman, Darby & Cushman

[57] ABSTRACT

A device for adjusting the distance between soil working tools such as plow bodies (5) disposed beside each other and fitted to sleeves (7) movable along a bar (3). Slewing brackets (11, 14, 15) for defining the movements of the sleeves (7) along the bar (3) are arranged articulatedly between the sleeves (7) so that the relative movement between the two outermost sleeves on the bar is a (n−1), where a is the distance of the movement between two adjacent sleeves (7) and n is the number of sleeves. A hydraulic piston-cylinder unit is arranged to provide the motion of the sleeves (7) along the bar (3).

12 Claims, 2 Drawing Sheets

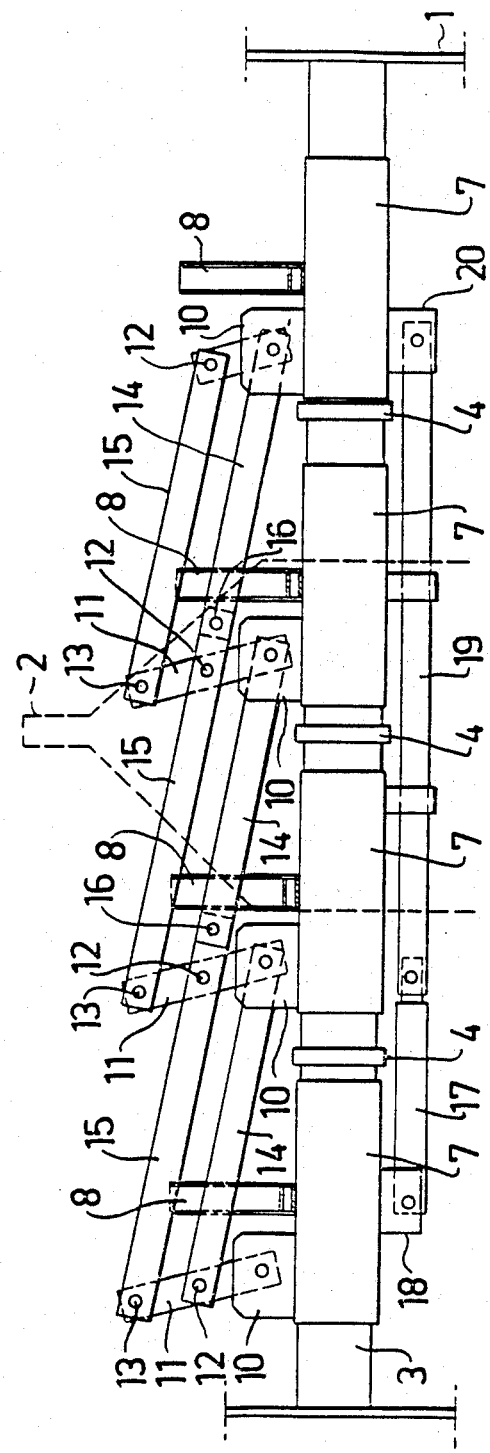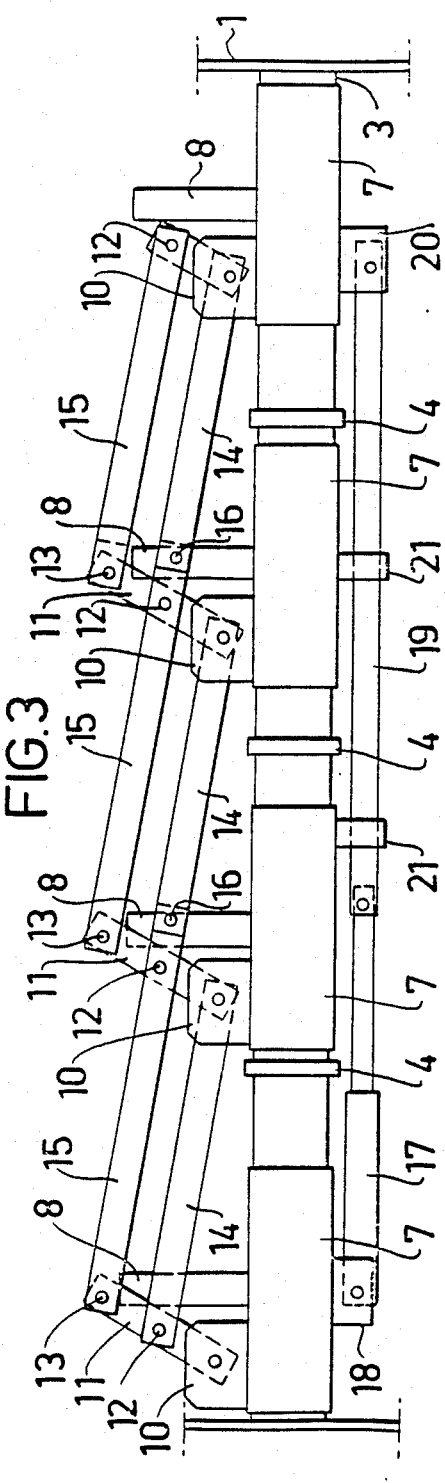

DEVICE FOR ADJUSTING THE DISTANCE BETWEEN SOIL-WORKING TOOLS

BACKGROUND OF THE INVENTION

This invention relates to a device for adjusting the distance between soil-working tools disposed beside each other and fitted to means movable along a draw bar. The device allows a rapid adjustment of the centre distance between the soil-working tools which adjustment can be performed from the driver's cabin of the traction vehicle.

When fields are worked by means of different types of soil-working tools the soil will be prepared in different ways varying from time to time depending on its humidity, just then, and different soil types vary mutually in different ways.

As an example it can be mentioned that a ridge width of 57 cm is obtained in ploughing in order to obtain an intended working of dry soil. The same soil requires, when damped, throughout a ridge width of 60 cm to obtain the corresponding working as set dry soil. Other factors influencing the ridge width in order to attain a perfect result are if the soil has been previously worked, e.g. stubble worked using another tool.

The problem has been known before and there are different types of solutions for moving the tools relative to each other. All these solutions require that the tools are individually moved manually at the tool frame. Due to the fact that the adjustment must be made repeatedly before the correct centre distance between the working tools has been obtained for the occasion and that the adjustment of the different tools is heavy per se and requires work, it goes without saying that the matter has been left as it is and the same setting has been used the whole time, independently of species of soil and soil humidity.

SUMMARY OF THE INVENTION

A rapid adjustment of the distance between the soil-working tools is obtained through the invention and this adjustment can be made from within the driver's cabin of the traction vehicle. This is possible because the invention has been given the characteristic features defined in the claims.

BRIEF DESCRIPTION OF THE DRAWINGS

The invention will be described in greater detail in the form of an example with reference to the attached drawings, wherein FIG. 2 shows a detached part of the tool that is the invention, with a certain distance between the soil working tools, FIG. 3 shows the invention with another distance between the tools, and FIG. 4 is a longitudinal sectional view of the plow of FIG. 1.

DETAILED DESCRIPTION OF A PREFERRED EMBODIMENT

Figure 1:
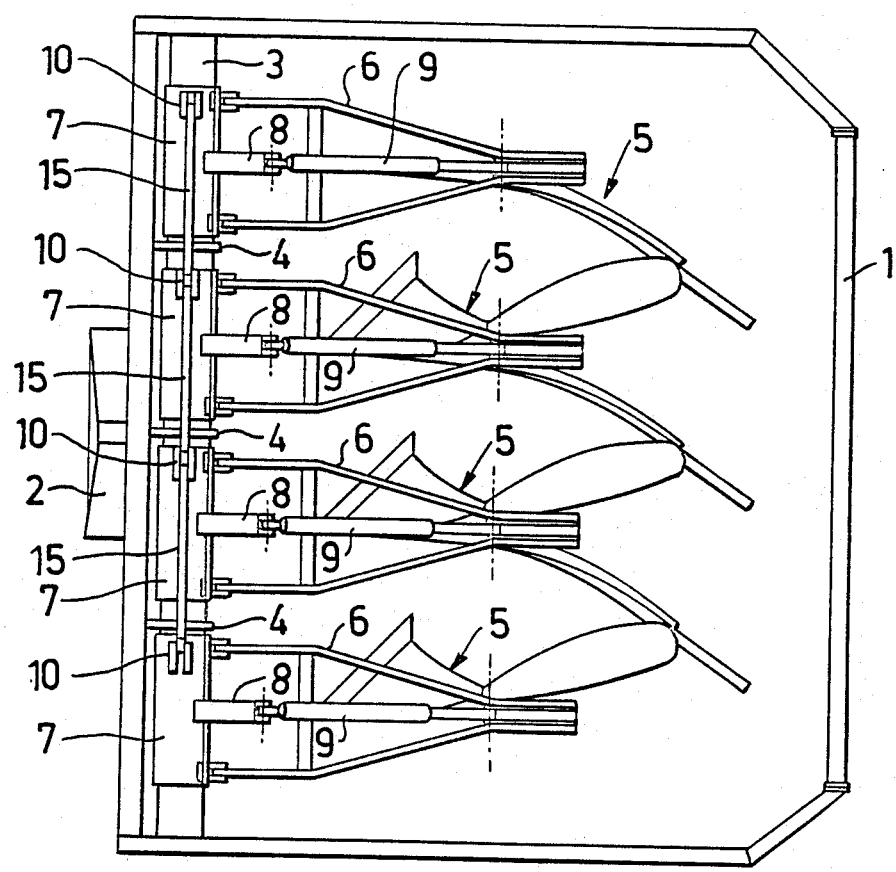
FIG. 1 shows schematically a top plan view of a tool in the form of a plow where the invention is utilized.

The tool is shown schematically in FIGS. 1 and 2 in the form of a frame 1 at which means 2 for fitting the plow to the tool coupling of the traction vehicle—tractor—is arranged. At the front of the frame, a beam 3 is attached to the frame sides, by means of braces 4. The working tools, in this case plow bodies 5, are articulatedly attached to sleeves 7 which are movable along the beam 3 via plow ridges 6 with double arms. The plow bodies 5 can be adjusted by means of arms 8 and stone-release means 9 and be kept on the correct level during work. The tool described here is known as such and is, for instance, taught in Swedish Pat. No. 8402338-1.

According to the invention, a bearing 10 in the form of, for instance, two upright parallel ears is disposed on the upper side of the respective sleeve 7. As is apparent from FIGS. 2 and 3, a slewing bracket 11 is pivotably mounted in each bearing 10. The respective slewing bracket 11 has, in addition to the bearing hole for the mounting of the arm in the bearing 10, two additional bearing holes 12 and 13, respectively, the distance between all the holes being equal—for natural reasons, as appears from below, the rightmost slewing bracket 11 as seen in FIGS. 2 and 3 need not be provided with an outermost third bearing hole. A bracket, 14 extends articulatedly from the central bearing hole 12 in the respective slewing bracket 11 to the bearing 10 of the sleeve 7 immediately nearby. Another bracket 15 extends articulatedly from the outermost bearing hole 13 of the respective slewing bracket 11 to the central hole 12 of the adjacent slewing bracket 11 thereby providing respective photographic linkages. When geometrically possible, the first bracket 14 and the second bracket 15 can be built together to one single bracket, in theory, see FIGS. 2 and 3, but for technical and functional reasons the brackets should be articulated with each other. These joints are shown at 16 in FIGS. 2 and 3. In other words, the structure 11, 14, 15, 12, 13 provides pantographic linkages comprising bars and longitudinally extending horizontal axis pivot joints.

A hydraulic piston-cylinder unit 17 is arranged diametrically to the bearings 10 relative to the beam 3. In the example shown, the cylinder is fitted to a bearing 18 of the left sleeve 7, as seen in FIGS. 2 and 3, and the piston rod is extended by means of a rod 19 which is connected, with its outermost end, to a bearing 20 of the right sleeve 7, as seen in FIGS. 2 and 3.

In FIG. 2, a position of the sleeves 7 is shown in which these and consequently the plough bodies 5 are located at a smaller distance from each other. In FIG. 2, the position is shown wherein which the sleeves 7 and consequently the plough bodies 5, are at a greater distance from each other. When the piston in the piston-cylinder unit 17 is forced out of the cylinder from the position shown in FIG. 2, meaning that the outermost sleeves 7 are influenced and removed from each other, the brackets 14 and 15 will control, by force, the movements of the intermediate sleeves, exactly, relative to the outer sleeves. In other words, if the first left sleeve 7 is though to be still and the other adjacent sleeve is to move the way a from the first-mentioned left sleeve, the third sleeve must move the distance 2a from the first-mentioned sleeve and the fourth sleeve the distance 3a from the first-mentioned sleeve. As the slewing brackets 11 are evenly distributed between the bearing holes 13, 12 and the bearing hole in the bearing 10 and the "lower" bracket 14 extends from the hole 12 of the bearing bracket 11 to the bearing 10 while the "upper" bracket 15 extends from the upper end of the slewing bracket 11 to the bearing 10 of the remotest sleeve 7 but one, this will move twice as far as the closest or intermediate sleeve 7. As this sleeve moves a distance a, the slewing bracket 11 of this will also be moved the distance a, meaning that this distance is "superimposed" to the following slewing brackets—sleeves. It is apparent from the drawings that the whole assembly of sleeves (four in the example) can be moved along the beam 3, which allows a good flexibility and adaptation of the tool.

By arranging the bracket system on one side of the main beam 3 and the driving piston-cylinder unit 17 on the other side of the beam and engaging the two outermost sleeves 7, an extremely easily operable device is obtained by the embodiment shown, at which the risk of a drawer effect is eliminated.

As is apparent from FIGS. 2 and 3, the extension rod 19 of the piston rod is movably mounted in the intermediate sleeves 7 by means of, for instance, flanges 21 provided with holes. The piston is operated from the driver's cabin on the traction vehicle (not shown).

It is to be understood that the bracket system can be formed in other ways within the scope of the invention, the desired effect being achieved, and there are several different possibilities for one skilled in the art. However, it has been found that the embodiment described here as an example can be produced very simply and cheaply and at the same time it has a good reliability in function with a possibility to good measure tolerances. Moreover, it should be understood that, of course, more than four sleeves 7 or equivalent means can be operated in the way described above, depending on the form and appearance of the beam.

As soil-working tools, any other tools, in which the invention can be utilized, should be understood beyond plow bodies.

I claim:

1. Soil-working apparatus, comprising:
a frame adapted to be moved along over the soil, said frame including a bar extending widthwise of said frame;
a plurality of soil-working tools transversally spaced from one another and arranged in a series which extends widthwise of said frame, said soil-working tools being adapted to workingly operate upon the soil as the frame is moved along over the soil;
means adjustably mounting the soil-working tools to said bar, said mounting means including a series of respective sleeve means, each sleeve means being mounted to a respective said soil-working tool and adjustably mounted on said bar for movement along said bar transversally of said frame;
length-adjustable means mounted between two of said sleeve means for adjustably moving said two sleeve means towards and away from one another along said bar and for maintaining a selected spacing thereof transversally of said frame, said length-adjustable means being a pressurized fluid-operated extensible-retractable piston and cylinder arrangement having opposite ends connected to respective ones of said sleeve means; and
mechanical linkage means coordinately interconnecting all of said sleeve means so that as said two sleeve means are moved towards and away from one another by adjusting said length-adjustble means, all of said sleeve means are coordinately respaced with some of said sleeve means thereby being caused to travel further than others in order to maintain generally proportions relative spacing regardless of absolute amount of spacing between said sleeve means.

2. The soil-working apparatus of claim 1, wherein:
two among said sleeve means are disposed laterally outermost in said series on said bar; and
said opposite ends of said piston and cylinder arrangement are connected to said laterally outermost sleeve means.

3. The soil-working apparatus of claim 2, wherein:
said mechanical linkage means are constituted by pantographic linkages.

4. The soil-working apparatus of claim 1, wherein:
said soil-working tools are plows.

5. Soil-working apparatus, comprising:
a frame adapted to be moved along over the soil, said frame including a bar extending widthwise of said frame;
a plurality of soil-working tools transversally spaced from one another and arranged in a series which extends widthwise of said frame, said soil-working tools being adapted to workingly operate upon the soil as the frame is moved along over the soil;
means adjustably mounting the soil-working tools to said bar, said mounting means including a series of respective sleeve means, each sleeve means being mounted to a respective said soil-working tool and adjustably mounted on said bar for movement along said bar transversally of said frame;
length-adjustable means mounted between two of said sleeve means for adjustably moving said two sleeve means towards and away from one another along said bar and for maintaining a selected spacing thereof transversally of said frame; and
mechanical linkage means coordinately interconnecting all of said sleeve means so that as said two sleeve means are moved towards and away from one another by adjusting said length-adjustable means, all of said sleeve means are coordinately respaced with some of said sleeve means thereby being caused to travel further than others in order to maintain generally proportionate relative spacing regardless of absolute amount of spacing between said sleeve means,
said mechanical linkage means being constituted by pantographic linkages.

6. The soil-working apparatus of claim 5, wherein:
two said sleeve means are disposed laterally outermost in said series on said bar;
said series includes at least four said sleeve means; and
said mechanical linkages are connected and operable to move both said laterally outermost sleeve means further than all others of said sleeve means upon adjustment of the length of said length-adjustable means.

7. The soil-working apparatus of claim 6, wherein:
each sleeve means comprises a pivot joint having a longitudinally-oriented, generally horizontal axis; and
said pantograph linkages include a respective slewing bracket pivoted to each said pivot joint for leftward-rightward slewing movement; and
a first plurality of brackets pivotally interconnecting all neighboring groups of three of said slewing brackets by means of pivot joints having longitudinally-oriented, generally horizontal axes, and a pair of brackets pivotally interconnecting said slewing brackets of the respectively neighboring ones of said sleeve means by means of pivot joints having longitudinally-oriented, generally horizontal axes.

8. The soil-working apparatus of claim 7, wherein:

said length adjustable means and said pantograph linkages are disposed diametrically opposite one another circumferentially of said bar.

9. The soil-working apparatus of claim 8, wherein: said slewing brackets are pivoted to said sleeve means at respective lower ends of said slewing brackets and project upwardly therefrom, said pantograph linkages are disposed above said bar, and said length-adjustable means is disposed below said bar.

10. The soil-working apparatus of claim 9, wherein: said length-adjustable means is a pressurized fluid-operated extensible-retractable piston and cylinder arrangement having opposite ends connected to respective ones of said sleeve means.

11. The soil-working apparatus of claim 10, wherein: said opposite ends of said piston and cylinder arrangement are connected to said laterally outermost sleeve means.

12. The soil-working apparatus of claim 11, wherein: said soil-working tools are plows.

* * * * *